(12) United States Patent
Goebel et al.

(10) Patent No.: US 7,781,086 B2
(45) Date of Patent: Aug. 24, 2010

(54) FUEL PROCESSING SYSTEM HAVING GAS RECIRCULATION FOR TRANSIENT OPERATIONS

(75) Inventors: Steven G Goebel, Victor, NY (US); William H Pettit, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 78 days.

(21) Appl. No.: 12/187,993

(22) Filed: Aug. 7, 2008

(65) Prior Publication Data

US 2008/0292924 A1    Nov. 27, 2008

Related U.S. Application Data

(62) Division of application No. 10/963,248, filed on Oct. 12, 2004, now Pat. No. 7,442,461, which is a division of application No. 10/055,101, filed on Jan. 22, 2002, now Pat. No. 6,838,200.

(51) Int. Cl.
*H01M 2/14* (2006.01)

(52) U.S. Cl. ............................ 429/34; 429/38; 429/19; 429/39

(58) Field of Classification Search .................. 429/20, 429/19, 17, 38, 39, 34; 422/198, 234, 187, 422/127.9; 48/127.9
See application file for complete search history.

(56) References Cited

U.S. PATENT DOCUMENTS

| | | | |
|---|---|---|---|
| 6,331,366 B1 * | 12/2001 | Van Dine et al. | 429/17 |
| 2001/0018141 A1 * | 8/2001 | Kobayashi | 429/20 |
| 2003/0027024 A1 * | 2/2003 | Iio et al. | 429/19 |

* cited by examiner

*Primary Examiner*—Raymond Alejandro
(74) *Attorney, Agent, or Firm*—Harness, Dickey & Pierce, P.L.C.

(57) ABSTRACT

A fuel processor system capable of circulating fuel processor system gases, e.g. reformate, anode exhaust, and/or combustor exhaust, through a fuel processor provides advantages. The system fuel cells discharge hydrogen-containing anode exhaust and oxygen-containing cathode exhaust, The fuel processor converts hydrogen-containing fuel to hydrogen-containing reformate to fuel the fuel cells. A catalytic combustor coupled with a vaporizer reactor is positioned in series downstream from the fuel cells. A bypass passage connects an outlet of at least one of the fuel processor, the fuel cells, the catalytic combustor, and the vaporizer reactor to the inlet of the fuel processor. The bypass passage is operable to circulate a fuel processor system gas to the inlet of the fuel processor.

10 Claims, 4 Drawing Sheets

FUEL PROCESSING SYSTEM HAVING GAS RECIRCULATION FOR TRANSIENT OPERATIONS

CROSS-REFERENCE TO RELATED APPLICATIONS

This application is a divisional of U.S. patent application Ser. No. 10/963,248 filed Oct. 12, 2004 (now U.S. Pat. No. 7,442,461, issued Oct. 28, 2008), which is a divisional of U.S. patent application Ser. No. 10/055,101 filed Jan. 22, 2002 (now U.S. Pat. No. 6,838,200, issued Jan. 4, 2005). The entire disclosures of each of these applications are incorporated herein by reference.

FIELD OF THE INVENTION

The present invention generally relates to fuel processors and, more particularly, relates to a fuel processor system having gas recirculation for improved startup, shut down, turn down, and transient operation.

BACKGROUND OF THE INVENTION

As is well known to those skilled in the art, in order to heat rapidly the mass of a fuel processor to its proper operating temperature during a startup cycle, it is preferable to provide the largest possible heating gas flow therethrough. However, using fuel rich-combustion gas flow may exceed the temperature limits in the earlier stages of the fuel processor, thereby requiring additional stages to fully heat the remaining stages of the fuel processor.

During a shut down cycle, it is desirable to remove water from the fuel processor so that the water does not condense onto the catalysts when the fuel processor completely cools, which may damage the catalysts. Furthermore, it is also desirable to stop the fuel processor in a pressurized state so that when the fuel processor cools and the gases contract, the pressure the fuel processor remains above atmospheric pressure so that air is not drawn into the fuel processor. Conventional shut down methods cannot continue operating without water injection, as the ATR catalyst would get too hot.

During a turn down cycle, it is preferable to circulate a larger flow so that the residence times within the reactors are more constant. However, in conventional fuel processors, as the power level is turned down the flow is thus reduced and the residence times in each reactor increases. This increase in residence times may lead to auto-ignition in the inlet, reverse water gas shift in the PrOx, cell reversal in fuel cell stack due to non-uniform flow distribution of hydrogen containing reformate, and water collection in fuel cell stack.

During a transient cycle, it is preferable to have a constant flow through the reactors such that the pressure in the reactors remains generally constant, thereby minimizing the lag in transient response associated with filling or venting volumes of the fuel processor.

Accordingly, there exists a need in the relevant art to provide a fuel processor that is capable of rapid thermal start without the complexity of multiple stages or risk of oxygen exposure. Furthermore, there exists a need in the relevant art to provide a fuel processor that, during shut down, is capable of minimizing water in the reformate and be shut down at an elevated pressure to minimize condensation on the catalyst and air ingestion upon cooling. Still further, there exists a need in the relevant art to provide a fuel processor that, during turn down, is capable of minimizing auto-ignition in the inlet, reverse water gas shift in the PrOx, cell reversal in fuel cell stack due to non-uniform flow distribution of hydrogen containing reformate, and water collection in fuel cell stack. Yet further, there exists a need in the relevant art to provide a fuel processor that, during transient operation, is capable of maintaining a generally constant flow rate through to the fuel processor to minimize the lag time associated with filling or venting volumes of the fuel processor. Still further, there exists a need in the relevant art to provide a fuel processor that is capable of operating without water injection.

SUMMARY OF THE INVENTION

A fuel processor system capable of recirculating fuel processor system gases, such as reformate, anode exhaust, and/or combustor exhaust, through the fuel processor to provide a number of distinct advantages is provided. A fuel processor is also provided for converting a hydrogen-containing fuel to $H_2$-containing reformate. The fuel processor system may also include a plurality of fuel cells discharging an $H_2$-containing anode effluent and an $O_2$-containing cathode effluent. A catalytic combustor is positioned in series downstream from the plurality of fuel cells and a vaporizer reactor is coupled to the catalytic combustor. A bypass passage interconnects an outlet of at least one of the group consisting of the fuel processor, the fuel cell, the catalytic combustor, and the vaporizer reactor to the inlet of the fuel processor. The bypass passage is operable to recirculate a fuel processor system gas to the inlet of the fuel processor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, the present invention is hereafter described in the context of a fuel cell fueled by reformed gasoline. However, it is to be understood that the principles embodied herein are equally applicable to fuel cells fueled by other reformable fuels. Furthermore, the present invention hereafter described in the context of a self contained fuel cell system having a reforming system and a fuel cell system. However, it is to be understood that the principles embodied herein are equally applicable to a reforming system only.

Figure 1:
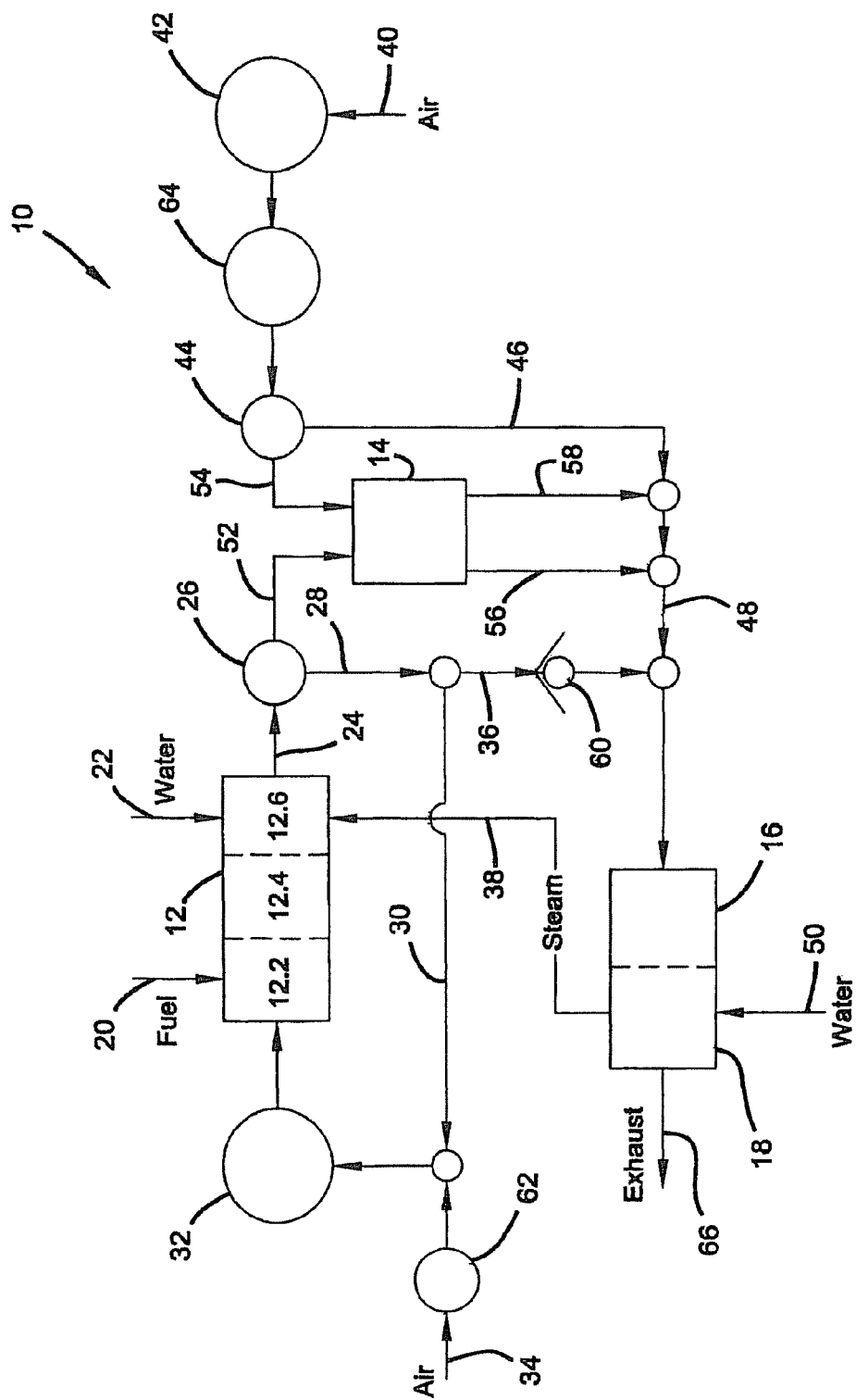
FIG. 1 is a schematic view illustrating a fuel processor system according to a first embodiment of the present invention.

Referring to FIG. 1, a fuel processor system, generally indicated as 10, according to a first embodiment of the present invention is illustrated, which provides rapid startup capabilities. Fuel processor system 10 generally includes a fuel processor 12, a fuel cell stack 14, a catalytic combustor reactor 16, and a vaporizer reactor 18. Fuel processor 12 would typically include a primary reactor 12.2 such as a steam reformer or an autothermal reformer, a water gas shift (WGS) reactor 12.4 and a preferential oxidation (PrOx) reactor 12.6.

Fuel processor system 10 is arranged such that a first fuel inlet stream 20 and a first water inlet stream 22 are introduced into fuel processor 12 to produce a reformate stream 24 according to conventional principles. During a startup cycle, an anode bypass valve 26 directs reformate stream 24 to an anode bypass passage 28. It is necessary to initially bypass fuel cell stack 14 until "stack grade" (having CO content less than about 100 ppm) reformate is produced. In order to produce such stack grade reformate, it is necessary to heat the various components of fuel processor system 10 to their respective operating temperatures. Recirculated reformate in passage 30 from anode bypass passage 28 is drawn into a recirculation compressor 32 together with a first inlet air stream 34.

First fuel inlet stream 20 is then introduced into fuel processor 12. Reactions may be initiated in fuel processor 12 via a spark lit burner or by an electrically heated catalyst section (not shown). Heat produced by the reaction of first fuel inlet stream 20 and first inlet air stream 34 warms fuel processor 12. First fuel inlet stream 20 and first inlet air stream 34 are introduced in proportions slightly rich of stoichiometric. This ensures that there is no excess oxygen, which could damage the catalysts within fuel processor 12. Ordinarily, reactions near stoichiometric conditions produce damagingly high temperatures; however, with a large excess of recirculated reformate 30 acting as a diluent, the gas temperature within fuel processor 12 is maintained at an appropriate level.

A portion, generally indicated at 36, of the flow through anode bypass passage 28 is exhausted to catalytic combustor reactor 16. Under steady flow, this exhausted reformate 36 is equal to the total mass flow of first fuel inlet stream 20, first inlet air stream 34, first water inlet stream 22 and vaporizer steam 38 that passes through fuel processor 12. This exhausted reformate 36 is reacted with a second inlet air stream 40 in catalytic combustor reactor 16. Second inlet air stream 40 is directed to catalytic combustor reactor 16 via a stack air compressor 42, a cathode bypass valve 44, a cathode bypass passage 46, and an exhaust passage 48. Second inlet air stream 40 is bypassed around fuel cell stack 14 during startup to prevent drying of the membranes within fuel cell stack 14. Heat from the reaction in catalytic combustor reactor 16 is integrated back into fuel processor 12 by vaporizing second water inlet stream 50 in vaporizer reactor 18 to produce vaporizer steam 38, which typically is delivered to the PrOx-vaporizer or steam lines within fuel processor 12. Exhaust gases from combustor 16 exits vaporizer reactor 18 through exhaust outlet 66.

During the startup cycle, the fuel and air are completely consumed (stoichiometric conditions) for maximum heat release within fuel processor system 12 for rapid heating without excessively high temperatures. However, it is important to note that the temperature within the PrOx 12.6 may initially be relatively high at about 357° C. However, once the PrOx is heated, normal operation is such that cooling of the PrOx according to conventional methods can be used.

Referring again to FIG. 1, once the various reactors within fuel processor 12 are warmed to their operating temperature, anode bypass valve 26 routes reformate stream 24 to fuel cell stack 14 via passage 52. Second inlet air stream 40 is then directed by cathode bypass valve 44 to the cathode side of fuel cell stack 14 via passage 54. The hydrogen from reformate stream 24 reacts with the oxygen from second air inlet stream 40 across a membrane electrode assembly within fuel cell stack 14 to produce electricity. Anode exhaust or stack effluent 56 from the anode side of fuel cell stack 14 includes a portion of hydrogen that is directed back to catalytic combustor reactor 16 to provide heat recovered in vaporizer 18. Cathode exhaust 58 from the cathode side of fuel cell stack 14 includes oxygen also for use in catalytic combustor reactor 16. Anode exhaust 56 and cathode exhaust 58 are combined in exhaust passage 48 and react in catalytic combustor reactor 16. Vaporizer reactor 18 continues to provide vaporizer steam 38 to fuel processor 12. Note that the PrOx air, within fuel processor 12, is drawn from recirculation compressor 32 which contains only first inlet air stream 34 when anode bypass valve 26 directs reformate stream 24 to fuel cell stack 14. Preferably, a reformate check valve 60 is disposed in exhausted reformate passage 36 to ensure that anode exhaust 56 and cathode exhaust 58 in exhaust passage 48 are not drawn into fuel processor 12 by recirculation compressor 32.

As is well known in the art, catalysts, such as that which is often used in water gas shift reactors (i.e. CuZn), are often sensitive to oxygen and condensed water. Therefore, this is particularly important after shut down when the fuel processor cools and any water vapor condenses. That is, the reformate gases within fuel processors often have a very high water (steam) content (typically 30%), which condense when the fuel processor cools after shut down. Additionally, as the fuel processor cools the condensation of water and the cooling of gases within the fuel processor may cause a reduction in gas pressure sufficient to pull a vacuum even if valves at the inlet and exit seal a fuel processor. At this point, any leaks present in the various valves, fittings, or flanges may allow air into the fuel processor and potentially damage the water gas shift catalyst. Therefore, additional features are illustrated in FIG. 2 to address these shut down issues.

Figure 2:
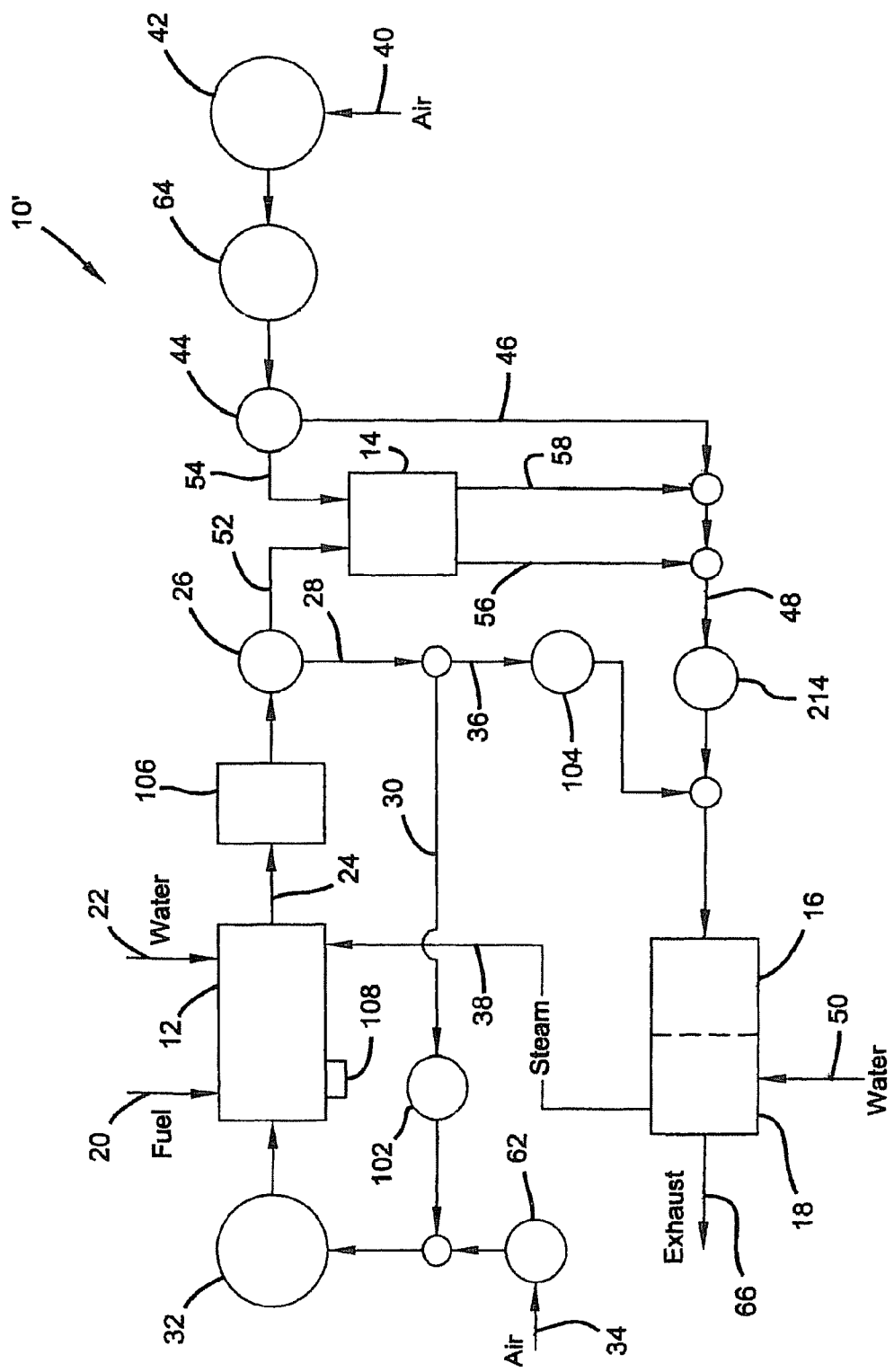
FIG. 2 is a schematic view illustrating a fuel processor system according to a second embodiment of the present invention.

The fuel processor system 10', shown in FIG. 2, is the same as that described in reference to FIG. 1, where like reference numerals are used to indicate like components. Referring to FIG. 2, a recirculation valve 102 is positioned in recirculated reformate passage 30 and an exhaust valve 104 is positioned in exhaust reformate passage 36. Recirculation valve 102 and exhaust valve 104 are used in conjunction to control the recirculation ratio (i.e., the ratio of recirculated reformate stream to the total reformate stream). That is, by opening recirculation valve 102 the flow of recirculated reformate 30 is increased, while opening exhaust valve 104 the flow of recirculated reformate 30 is decreased. Furthermore, opening both valves 102, 104 decreases the pressure within fuel processor 12. Recirculation valve 102 and/or exhaust valve 104 may be closed to prevent anode exhaust 56 and cathode exhaust 58 from being drawn into fuel processor 12 by recirculation compressor 32.

The transition to normal operation for fuel processor system 10', shown in FIG. 2, is the same as described in reference to FIG. 1.

Fuel processor system 10', shown in FIG. 2, further provide a means to shut down fuel processor 12 without water condensation or air ingestion. For shut down, reformate stream 24 is circulated to anode bypass passage 28 via anode bypass valve 26. Exhaust valve 104 remains closed to cause higher pressures within fuel processor 12. Recirculation valve 102 is then slightly opened to maximize pressure within the capacity of recirculation compressor 32. During shut down, water is condensed and separated from reformate stream 24 in a condenser 106, which is connected to the system coolant loop (not shown). In normal operation, condenser 106 is used as an anode pre-cooler before fuel cell stack 14.

To further increase the pressure within fuel processor 12 during shut down, recirculation compressor 32 draws in first inlet air stream 34. Preferably, the inlet to recirculation compressor 32 and the downstream side of circulation valve 102 are small in volume such that after recirculation compressor 32 is stopped, the pressure will remain high. Subsequently, the oxygen within first inlet air stream 34 will react with the hydrogen in recirculated reformate 30 within fuel processor 12 to produce additional heat, thereby increasing the pressure within fuel processor 12. However, if necessary, additional fuel from first fuel inlet stream 20 may be added during shut down to consume the oxygen in first inlet air stream 34 in order to provide sufficient reactants ($H_2$ and CO) within fuel processor 12. An oxygen sensor 108 is used in the fuel processor 12 as feedback to ensure that excess oxygen is not present. If the pressure within fuel processor 12 is higher than a predetermined level, exhaust valve 104 may be opened to reduce such pressure.

Once the water has been condensed from reformate stream 24 and a high pressure condition has been achieved within fuel processor 12, fuel processor air mass flow controller 62 is closed to seal the inlet, anode bypass valve 26 remains in the bypass position, and exhaust valve 104 remains closed to seal the exit. Recirculation compressor 32 is then stopped. The resident gases within fuel processor 12 are dry and at an elevated pressure, which is desired for shut down condition, particularly with a CuZn water gas shift catalyst.

During the shut down cycle, the fuel and air are completely consumed (stoichiometric conditions) without water injection and without excessively high reactor temperatures to allow the gases to be dried by condenser 106. Back pressure regulator 214 is described below in conjunction with fuel processor system 10.

As is well known in the art, conventional fuel processors suffer from various disadvantages when operating at reduce power and reduced flow, such as auto-ignition in the inlet, reverse water gas shift in the PrOx, cell reversal in the fuel cell stack, and water collection in the fuel cell stack. Furthermore, the transition between power levels are often slow to react due to the time necessary to pressurize or vent reactor volumes so as to achieve steady flow conditions at the new power level.

Within the primary reactor temperatures in the inlet region increase such that there is a limited amount of time before undesirable auto-ignition of the fuel will occur. As the flow through the fuel processor is reduced at low power, the residence time within the inlet is increased. Thus, the rate of reduction in flow and power is limited by the auto-ignition condition in the inlet.

Within the PrOx reactor, after the oxygen is consumed, reformate that is exposed to catalyst will undergo reverse water gas shift reactions, thereby consuming desirable $H_2$ and creating undesirable CO. At reduced flow, the oxygen is consumed earlier in the PrOx reactor, thereby leaving a larger section of catalyst and a longer residence time for reverse water gas shift reactions to occur.

Within the fuel cell stack, the current flow through each fuel cell is limited by the fuel cell provided the lowest quantity of $H_2$. That is, the fuel cell with the lowest $H_2$ flow limits the current through all of the remaining fuel cells. Therefore, a portion of the available quantity of $H_2$ (typically 10 to 20%) leaves the fuel cell stack unused. At reduced flows, the portion of $H_2$ leaving the fuel cell stack needs to be higher for stable operation, which is likely the result of less uniform flow distribution at reduced flows. Also contributing to the minimum flow for stable fuel cell stack operation is the need to clear condensed water to prevent it from collecting in and blocking passages within the gas distribution plates.

In conventional systems, the flow rate through the fuel processor system varies with power level, thus the associated pressure drop necessitates a change in reactor pressure between power levels. However, a change in reactor pressure requires time for flow to fill or vent to the downstream reactors in order to achieve the steady pressure at the new power level. The numerous aforementioned disadvantages are overcome in the present invention by maintaining a higher flow rate, even during low power operation, by recirculating gases through the fuel processor and stack.

Figure 3:
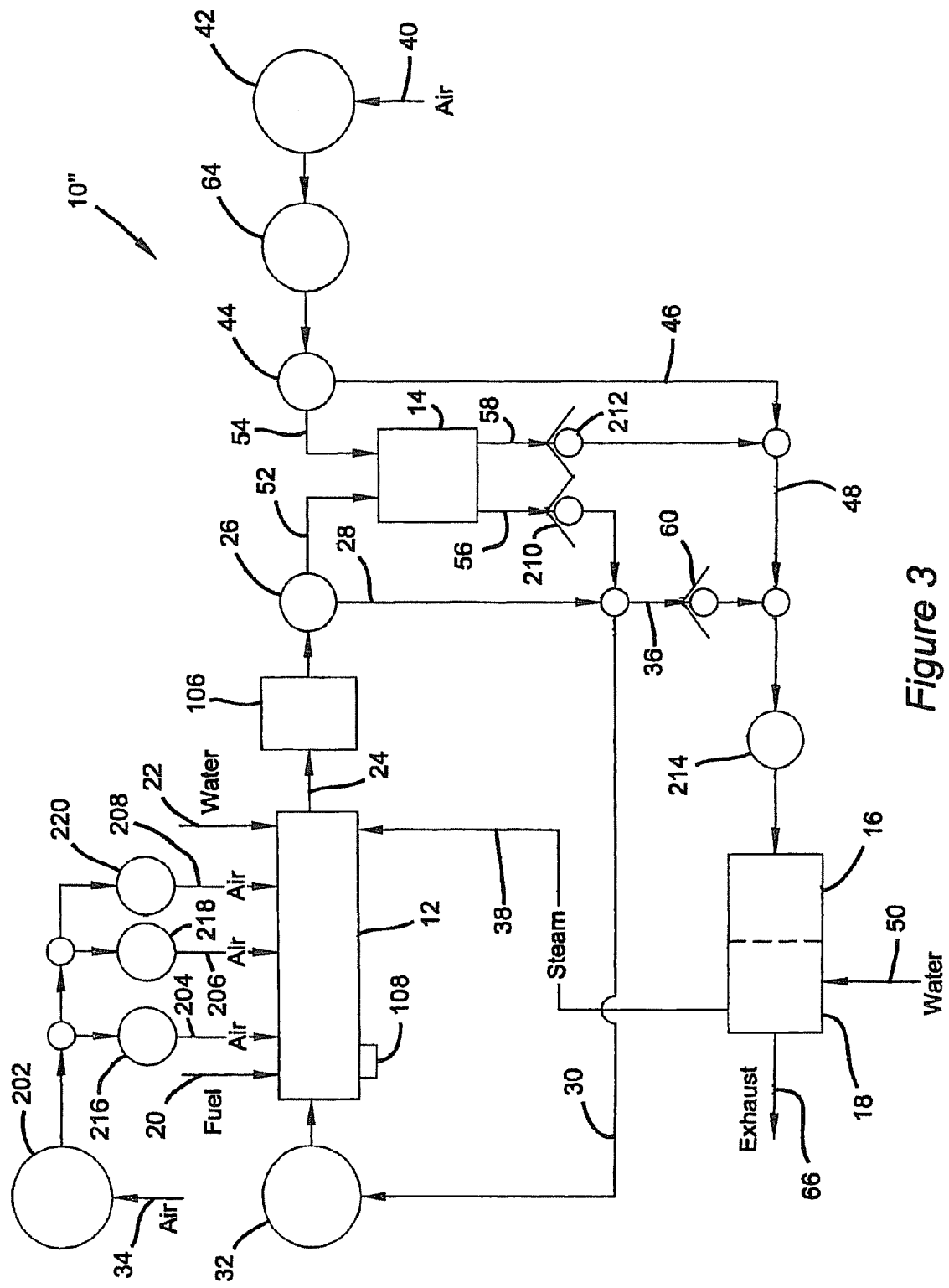
FIG. 3 is a schematic view illustrating a fuel processor system according to a third embodiment of the present invention.

Fuel processor system 10", shown in FIG. 3, illustrates a system having reformate circulation through the fuel processor for startup, means for water condensation and pressurization for shut down, and circulation through the fuel processor and anode for turn down and transients. The fuel processor system 10", shown in FIG. 3, is the same as that described in reference to FIGS. 1 and 2, where like reference numerals are used to indicate like components.

More particularly, for startup, anode bypass valve 26 directs reformate stream 24 to anode bypass passage 28. First fuel inlet stream 20 is introduced into fuel processor 12. First inlet air stream 34 is delivered to fuel processor 12 by a fuel processor air compressor 202. FIG. 3 shows first inlet air stream 34 being delivered to three locations in fuel processor 12 in the form of POx air stream 204, start air stream 206 and PrOx air stream 208. POx and PrOx air streams 204, 208 would normally be part of fuel processor 12. Heat produced by the reactions of fuel inlet stream 20 and inlet air stream 34 warms fuel processor 12. By staging the inlet air to provide multiple heating locations, the startup time is reduced by improving heat distribution within fuel processor 12.

To initiate reactions in each of these locations, a spark lit burner or an electrically heated catalyst section (not shown) is used. The overall oxygen to carbon (o/c) ratio (i.e. ratio of first inlet air stream 34 to first fuel inlet stream 20) is introduced in proportions slightly rich of stoichiometric to ensure that no excess oxygen is present, which could damage the catalyst within fuel processor 12. The recirculated reformate 30 acts as a diluent so that all the available first inlet air stream 34 is reacted without excessively high temperatures within fuel processor 12.

Exhaust reformate passage 36 is employed to exhaust excess reformate to catalytic combustor reactor 16. Under steady flow, this exhausted reformate in passage 36 is equal to the total mass flow of first fuel inlet stream 20, first inlet air stream 34, first water inlet stream 22 and vaporizer steam 38 that passes through fuel processor 12. This exhausted reformate in passage 36 is reacted with second inlet air stream 40 in catalytic combustor reactor 16. Second inlet air stream 40 is directed to catalytic combustor reactor 16 via stack air compressor 42, cathode bypass valve 44, cathode bypass passage 46, and exhaust passage 48. Second inlet air stream 40 is bypassed around fuel cell stack 14 during startup to prevent drying of the membranes within fuel cell stack 14. Heat from the reaction in catalytic combustor reactor 16 is integrated back into fuel processor 12 by vaporizing second water inlet stream 50 in vaporizer reactor 18 to produce vaporizer steam 38, which typically is delivered to the PrOx-vaporizer or steam lines within fuel processor 12. An anode check valve 210 and a cathode check valve 212 are shown to prevent back flow of reformate exhaust 48 into fuel cell stack 14. Preferably, a reformate check valve 60 is also disposed in exhausted reformate passage 36 to ensure that anode exhaust 56 and cathode exhaust 58 in exhaust passage 48 are not drawn into fuel processor 12 by recirculation compressor 32.

Once the various reactors within fuel processor 12 are warmed to their operating temperature, anode bypass valve 26 routes reformate stream 24 to fuel cell stack 14 via anode inlet passage 52. Second inlet air stream 40 is then directed by cathode bypass valve 44 to the cathode side of fuel cell stack 14 via cathode inlet passage 54. The hydrogen from reformate stream 24 reacts with the oxygen from second air inlet stream 40 across a membrane electrode assembly within fuel cell stack 14 to produce electricity. Anode exhaust or stack effluent 56 from the anode side of fuel cell stack 14 includes a portion of hydrogen that is directed back to catalytic combustor reactor 16 where it is oxidized to provide heat. Cathode exhaust 58 from the cathode side of fuel cell stack 14 includes oxygen which may also be used in catalytic combustor reactor 16. Anode exhaust 56 and cathode exhaust 58 are combined in exhaust passage 48 and react in catalytic combustor reactor 16. Vaporizer reactor 18 continues to provide vaporizer steam 38 to fuel processor 12.

A back pressure regulator 214 is used to set the pressure within fuel processor system 10'', while recirculation compressor 32 determines the amount of reformate recirculated. As additional flow from first fuel inlet stream 20, first inlet air stream 34, first water inlet stream 22, and vaporizer steam 38 is added to fuel processor 12, additional reformate flow will split to exhausted reformate passage 36 to maintain the system pressure. Therefore, at high power, the system 10'' operates at a low recirculation ratio, whereby a larger portion of reformate stream 24 is "fresh" having a relatively high $H_2$ content. At low power, the system 10'' operates at a high recirculation ratio, whereby a larger portion of reformate stream 24 is re-circulated and having a relatively low $H_2$ content. It is important to note that recirculation compressor 32 according to the present embodiment need only overcome the pressure drop through fuel processor 12 and fuel cell stack 14 during normal operation, unlike the system shown in FIG. 2 where the pressure would drop to atmospheric pressure downstream of recirculation valve 102 to allow first inlet air stream 34 to be drawn in. To this end, fuel processor system 10'' illustrated in FIG. 3 requires an additional fuel processor air compressor 202. Alternatively, stack air compressor 42 can be used to deliver air to fuel processor 12.

As best seen in FIG. 3, fuel processor system 10'' maintains a flow rate that is approximately equal to a fuel processor system operating at an optimum power level. This higher flow rate helps overcome many of the disadvantages described above.

During the shut down cycle of fuel processor system 10'', anode bypass valve 26 routes reformate stream 24 to anode bypass passage 28. Second inlet air stream 40 is then directed by cathode bypass valve 44 through cathode bypass passage 46 to catalytic combustor reactor 16. This will provide air to catalytic combustor reactor 16 to react with any exhausted reformate in passage 36 from the recirculation loop.

Backpressure regulator 214 is adjusted to indirectly produce the highest possible pressure within the capacity of recirculation compressor 32. As reformate stream 24 recirculates through fuel processor 12, water is condensed and separated in condenser 106.

To further increase the pressure within fuel processor 12 prior to shut down, fuel processor air compressor 202 draws in first inlet air stream 34. Subsequently, the oxygen within first inlet air stream 34 will react with the hydrogen in circulated reformate 30 within fuel processor 12 to produce additional heat, thereby increasing the pressure within fuel processor 12. However, if necessary, additional fuel from first fuel inlet stream 20 may be added during shut down to consume the oxygen in first inlet air stream 34 in order to provide sufficient reactants ($H_2$ and CO) within fuel processor 12. An $O_2$ sensor 108 is used in fuel processor 12 as feedback to ensure that excess oxygen is not present.

Once the water has been condensed from reformate stream 24 and a high pressure condition has been achieved within fuel processor 12, fuel processor air mass flow controllers 216, 218, 220 and stack air mass flow controller 64 are closed to seal the inlets, anode bypass valve 26 and cathode bypass valve 44 remain in the bypass position, and back pressure regulator 214 remains closed to seal the exit. Recirculation compressor 32, fuel processor air compressor 202, and stack air compressor 42 are stopped. The resident gases within fuel processor 12 are dry and at an elevated pressure, which is desired for shut down condition, particularly with a CuZn water gas shift catalyst.

Figure 4:
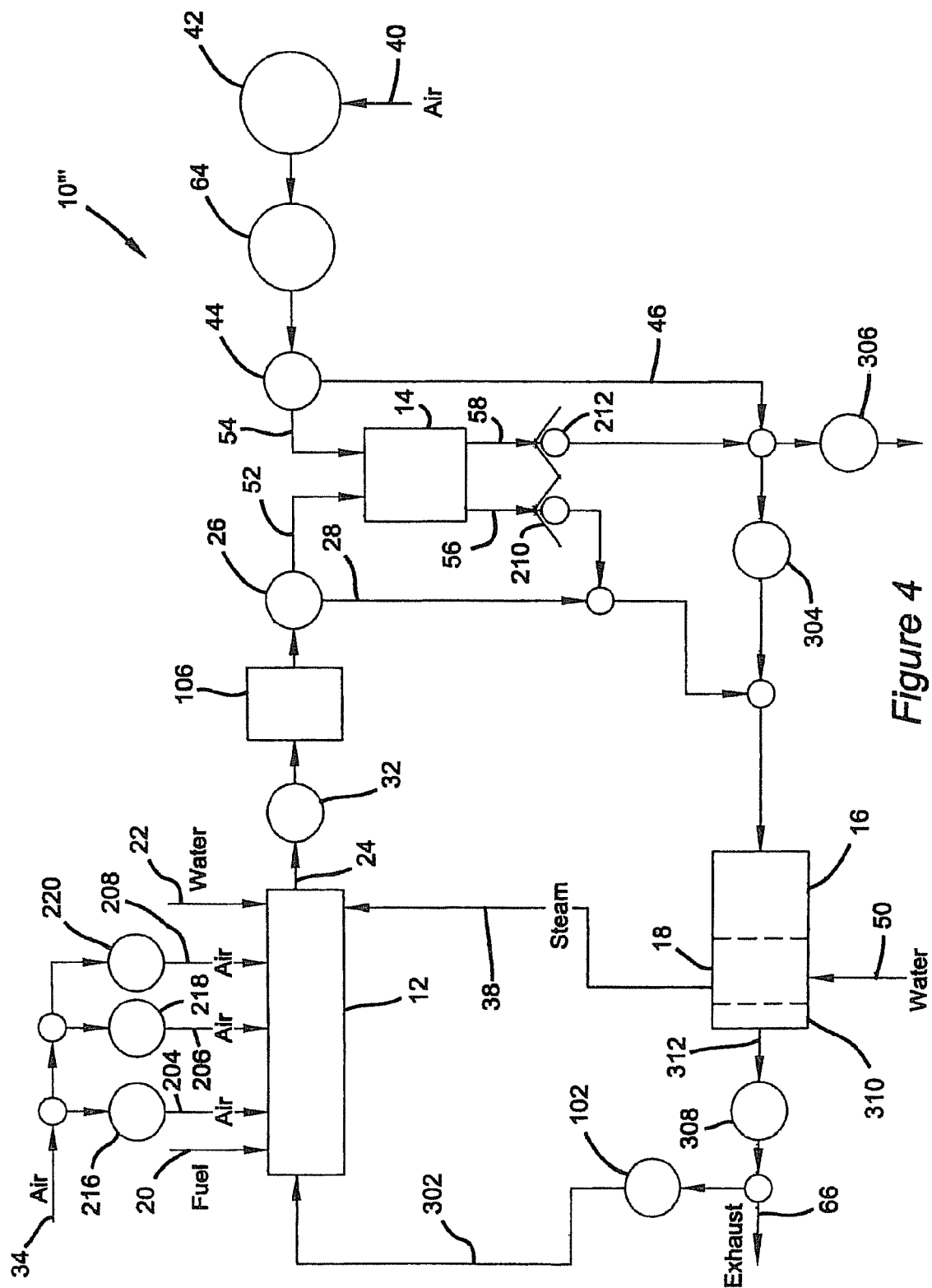
FIG. 4 is a schematic view illustrating a fuel processor system according to a fourth embodiment of the present invention.

Yet another alternative system is illustrated in FIG. 4 wherein a compressor may be eliminated from the fuel processor system, generally indicated at 10'''. Fuel processor system 10''' is operated at sub-atmospheric pressures such that potential for air ingestion exists. Otherwise, the startup, shut down, turn down and transient operation are similar to fuel processor system 10'' illustrated in FIG. 3. An additional benefit of fuel processor system 10''' is that a recirculated exhaust 302 can be made inert by providing just enough cathode exhaust 58 to catalytic combustor reactor 16 using a combustor air mass flow controller 304 for stoichiometric operation in catalytic combustor reactor 16.

A cathode back pressure regulator 306 is needed to match the pressure set by a back pressure regulator 308 downstream of catalytic combustor reactor 16 to ensure cathode exhaust 58 can be directed to catalytic combustor reactor 16. An $O_2$ sensor 310 may be used in exhaust 312 to ensure stoichiometric operation.

A unique capability of the aforementioned systems is the potential to operate without water addition. This is an advantage for a system that is to be started in ambient temperatures below 0° C., where water is not available. Because the system 10''' operates at a high recirculation, this mode of operation is relatively inefficient at about 62%, however it may be used for short duration.

It should be understood that features of the fuel processor systems illustrated in FIGS. 1-4 can be combined as needed for system requirements. For example, PrOx air 208 may preferably be delivered from stack air compressor 42. That is, various combinations of the various systems described herein might be made depending upon the specific application.

As should be appreciated from the foregoing discussion, the fuel processor systems of the present invention all include recirculation of fuel processor gases, such as reformate, anode exhaust, or combustor exhaust. This feature provides numerous advantages that are not present in conventional fuel processor systems. For example, the fuel processor systems of the present invention are capable of providing a large mass flow rate through the fuel processor to aid in heating the fuel processor components to the proper operating temperatures during startup. Moreover, during shut down, the fuel processor systems of the present invention enable the fuel processor to run dry and condense water from the reformate to avoid condensation on the catalysts and subsequently be shut down at an elevated pressure to prevent air ingestion upon cooling of the fuel processor. Still further, during turn down, the fuel processor systems of the present invention enable higher flow rates through the fuel processor and fuel cell stack to avoid auto-ignition in the inlet, reverse water gas shift in the PrOx, cell reversal in the fuel cell stack, and water collection, in the fuel cell stack, all of which occur at reduced flow rates. During transient response, the fuel processor systems of the present invention, by circulating gases, enables the flow rate and pressure in the fuel processor to remain nearly constant, thereby minimizing the lag in transient response associated with filling or venting volumes in the fuel processor system. The ability to use recirculated gases, which contain water vapor as a product of reaction, enables the fuel processor to run without water injection. The fuel processor systems of the present invention enable rapid thermal start of the fuel processor without the complexity of multiple stages or risk of oxygen exposure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel processing system comprising:
   a fuel processor having a fuel processor inlet and a fuel processor outlet;
   a combustor having a combustor inlet in fluid communication with said fuel processor outlet and a combustor outlet;
   a recirculation loop including a first valve for selectively providing fluid communication between said fuel processor outlet and said fuel processor inlet, wherein said recirculation loop provides fluid communication from said fuel processor outlet through said combustor to said fuel processor inlet, and
   a fuel cell having an anode inlet in fluid communication with the fuel processor outlet and an anode outlet;
   wherein the recirculation loop includes an anode bypass valve operably disposed directly between the fuel processor outlet and the anode inlet for selectively providing fluid communication between the fuel processor outlet and either the anode inlet or the combustor inlet, thereby bypassing the fuel cell; and
   a pressure regulator operably disposed directly between the combustor inlet and one of the anode outlet or the anode bypass valve.

2. A fuel processing system according to claim 1, wherein the recirculation loop includes a bypass valve for selectively providing fluid communication between said fuel processor inlet and at least one of said fuel processor outlet and said combustor outlet; and
   further comprising a bypass passage providing fluid communication between said recirculation loop and said combustor inlet comprising a check valve to prevent backflow therein.

3. A fuel processing system according to claim 1, wherein the pressure regulator is operably disposed between said combustor inlet and said anode outlet.

4. A fuel processing system according to claim 1, wherein the pressure regulator is operably disposed between said combustor inlet and said anode bypass valve.

5. A fuel processing system according to claim 1, further comprising a recirculation pump in fluid communication with said recirculation loop.

6. A fuel processing system according to claim 1, further comprising:
   a fuel cell between said fuel processor and said combustor having an anode inlet in fluid communication with said fuel processor outlet and an anode outlet in fluid communication with said combustor inlet; and
   a recirculation valve for controlling fluid communication through said recirculation loop.

7. A fuel processing system according to claim 1, further comprising:
   a fuel cell between said fuel processor and said combustor having an anode inlet in fluid communication with said fuel processor outlet and an anode outlet in fluid communication with said combustor inlet; and
   a recirculation pump in fluid communication with said recirculation loop, wherein said recirculation pump is operably disposed between said recirculation loop and said fuel processor inlet, and a pressure regulator operably disposed between said anode outlet and said combustor inlet.

8. A fuel processing system according to claim 1, further comprising:
   a fuel cell between said fuel processor and said combustor having an anode inlet in fluid communication with said fuel processor outlet and an anode outlet in fluid communication with said combustor inlet; and
   a cathode exhaust in fluid communication with said combustor inlet and having a check valve operably disposed between said cathode exhaust and said combustor inlet to prevent backflow through said fuel cell.

9. A fuel processing system according to claim 1, further comprising:
   a fuel cell between said fuel processor and said combustor having an anode inlet in fluid communication with said fuel processor outlet and an anode outlet in fluid communication with said combustor inlet; and
   a recirculation air supply in fluid communication with said recirculation loop.

10. A fuel processing system according to claim 1, further comprising:
    a fuel cell having an anode inlet in fluid communication with said fuel processor outlet and an anode outlet in fluid communication with said combustor inlet.

* * * * *